J. K. Taylor,
Bolt Cutter.
Nº 30,895. Patented Dec. 11, 1860.

Witnesses
E. Cohen
I. Hirsch

Inventor:
J. K. Taylor
per A. B. Stoughton atty

UNITED STATES PATENT OFFICE.

J. K. TAYLOR, OF BRIDGEPORT, CONNECTICUT.

BOLT-CUTTER.

Specification of Letters Patent No. 30,895, dated December 11, 1860.

*To all whom it may concern:*

Be it known that I, J. K. TAYLOR, of Bridgeport, in the county of Fairfield and State of Connecticut, have invented certain new and useful Improvements in Bolt-Cutters; and I do hereby declare the following to be a full, clear, and exact description of the construction and operation of the same, reference being had to the accompanying drawings, making a part of this specification, in which—

Figure 1:
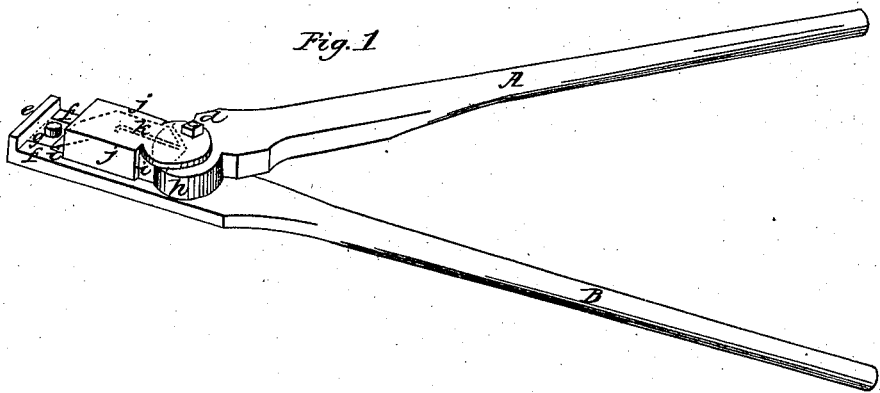
Figure 2:
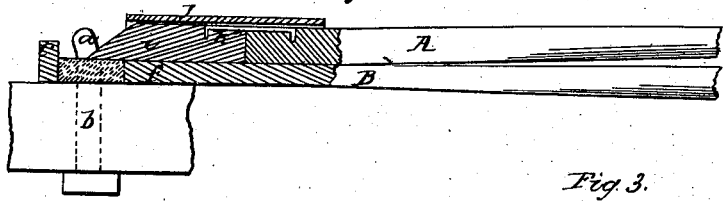
Figure 3:
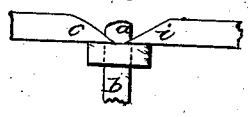
Figure 4:
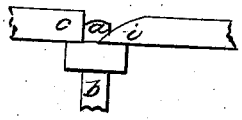

Figure 1 represents the bolt cutting tool, in perspective, and ready for use. Fig. 2 represents a longitudinal vertical section through the same. Figs. 3 and 4, are designed for illustrating the action of my bolt cutter, as compared with other tools designed for cutting off bolts.

Similar letters of reference where they occur in the separate figures denote like parts of the tool in the several drawings.

Bolt cutting tools have heretofore been used wherein the cutter was resisted by another cutter, or some support against the bolt. Both of these plans are objectionable because it requires so much power to operate them. When two cutting edges are used, as seen in Fig. 3, one or both of which is movable, a very great portion of the force is applied in raising the part $a$, that is to be cut off, or rather bearing it off from the part $b$, by forcing its fibers apart. Of course this is so much force expended for nothing. By using a square support as in Fig. 4, the same difficulty is encountered. The support $c$ will not allow the end of the bolt $a$, to bend away from the cutter, and the bevel of the cutter is constantly lifting the part $a$ vertically from the part $b$, which makes a tearing instead of a cutting operation. These hand bolt-cutters, must have something to hold onto, so as to aid the operator in his work, but it need not, as I have discovered, be the bolt itself, because that retards the cutting as I have shown. I have discovered that to have no resisting device of any kind on the opposite side of the bolt from the cutter, allows the part to be cut off, to readily bend away from the cutting edge straining the fibers which admits of their being more readily severed, and the end strain or bearing of the fibers is entirely avoided. The whole force is applied in this way to the cutting off of the bolt or other piece of metal, and not in tension or pulling apart of the fibers as in the cases referred to.

My invention consists in so combining a cutting tool, with a holding lever, in a bolt cutting instrument, as that there shall be no resistance on the opposite side of the bolt from the cutter, but that the nut, or some other thing shall hold or steady the holding lever, while the cutter is acting against the bolt.

To enable others skilled in the art, to make and use my invention, I will proceed to describe the same with reference to the drawings.

The instrument is composed of two levers or handles A, B, the former rigid, the latter hinged to it, as at $d$, so as to freely move on it. The lever A, has upon its end a flange $e$, and an opening is made through the part $f$, large enough to receive an ordinary sized nut $g$. The lever B, has a cam or eccentric $h$, made upon it, which works against a cutting tool $i$, and forces it forward toward, or over, the nut $g$. The cutting tool, may slide in or through a shield $j$, fastened to the lever A, and may be linked to the end of the lever B, as at $k$, so that said lever will draw it back, as well as push it forward.

To use this tool or instrument, the part $f$ or rather the opening in the part $f$, is placed over the nut $g$ of the bolt—the leg, lever, or handle A being swung out as shown in Fig. 1. Then by drawing A, toward B, the part $e$ comes up tight against the nut, the cutter $i$ comes against the part $a$ of the bolt, and severs it from the part $b$ close up to the face of the nut, the bevel of the cutter, bends over the part $a$ that is being cut off, there being no resisting medium on or against it, opposite to the cutting tool, and thus the user may with ease sever a piece of iron that he could not do, if there was resistance of any kind against the piece to be cut opposite to the cutter. By using the nut to hold onto the tool is steadied and guided, and the portion to be cut off can readily bend away from the force of the cutter.

Having thus fully described the construc- tion and operation of my bolt cutter, what I claim therein as new, and desire to secure by Letters Patent is—

Holding onto or against the nut (while the cutter is being actuated), by the lever B, instead of the bolt, for the purpose of leaving that part of the bolt that is to be cut off, free from any resistance on the side opposite to the cutter, substantially in the manner, and for the purpose set forth.

J. K. TAYLOR.

Witnesses:
CORTLAND KELSEY,
GILMAN CARTER.